United States Patent
Ramaswamy

(10) Patent No.: US 9,792,491 B1
(45) Date of Patent: Oct. 17, 2017

(54) APPROACHES FOR OBJECT TRACKING

(71) Applicant: Amazon Technologies, Inc., Reno, NV (US)

(72) Inventor: Sharadh Ramaswamy, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 429 days.

(21) Appl. No.: 14/220,048

(22) Filed: Mar. 19, 2014

(51) Int. Cl.
G06T 7/20 (2017.01)
G06K 9/00 (2006.01)

(52) U.S. Cl.
CPC ............ G06K 9/00362 (2013.01); G06T 7/20 (2013.01)

(58) Field of Classification Search
None
See application file for complete search history.

(56) References Cited

U.S. PATENT DOCUMENTS

2002/0080425 A1* 6/2002 Itokawa ............... G06K 9/6207 358/496
2003/0235341 A1* 12/2003 Gokturk ............. G06K 9/00228 382/243
2010/0128927 A1* 5/2010 Ikenoue ................ G06T 7/0083 382/103
2011/0211749 A1* 9/2011 Tan ........................ G06T 7/0081 382/154

OTHER PUBLICATIONS

Catanzaro, Bryan, et al. "Efficient, high-quality image contour detection." Computer vision, 2009 IEEE 12th international conference on. IEEE, 2009.*
"How to Find the Mean." How to Calculate the Mean Value. Math Is Fun, Feb. 14, 2011. Web. May 24, 2016.*

* cited by examiner

Primary Examiner — Chan Park
Assistant Examiner — Geoffrey E Summers
(74) Attorney, Agent, or Firm — Pierce Atwood LLP

(57) ABSTRACT

The location of a user's head, for purposes such as head tracking or motion input, can be determined using a two-step process. In a first step, at least one image is captured including a representation of at least a portion of the person, such as a head portion of the person. In a second step, a contour of the head portion can be determined, and a two-dimensional model, for example, an ellipse or other similar shape can be used to approximate the head portion of the person represented in the image. The ellipse, for example, can be modeled using a number of shapes, such as rectangles, and the portion of the person can be tracked by locating an ellipse that bounds a maximum intensity gradient of pixel values in each one of a series of images.

21 Claims, 10 Drawing Sheets

FIG. 1A
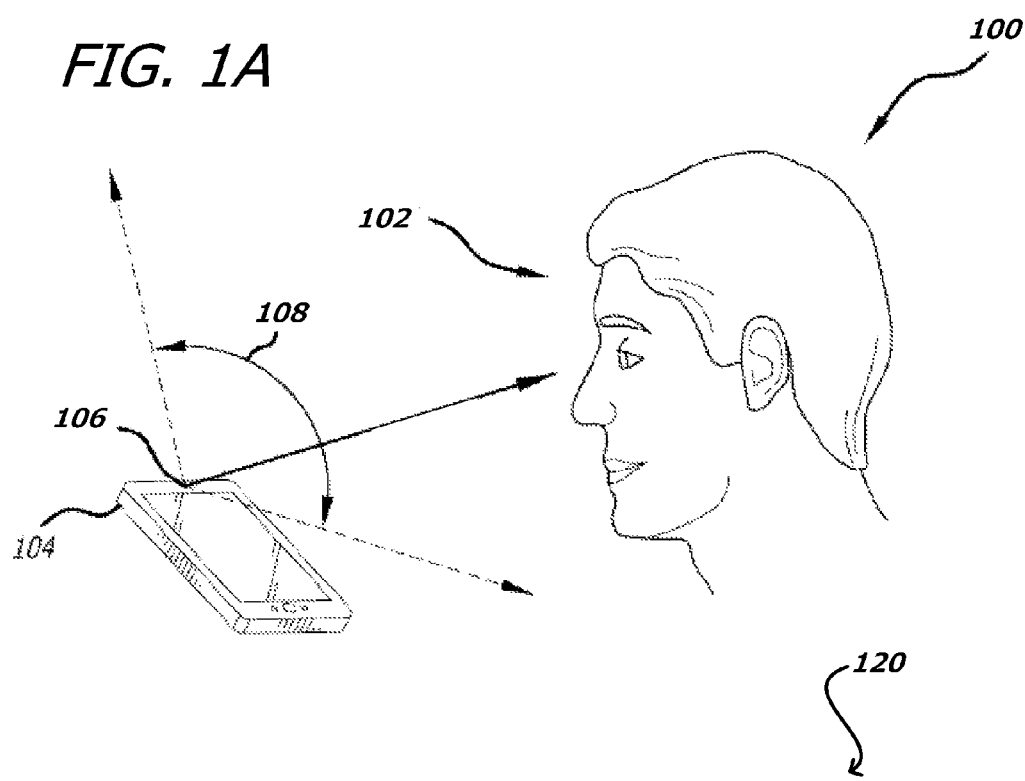
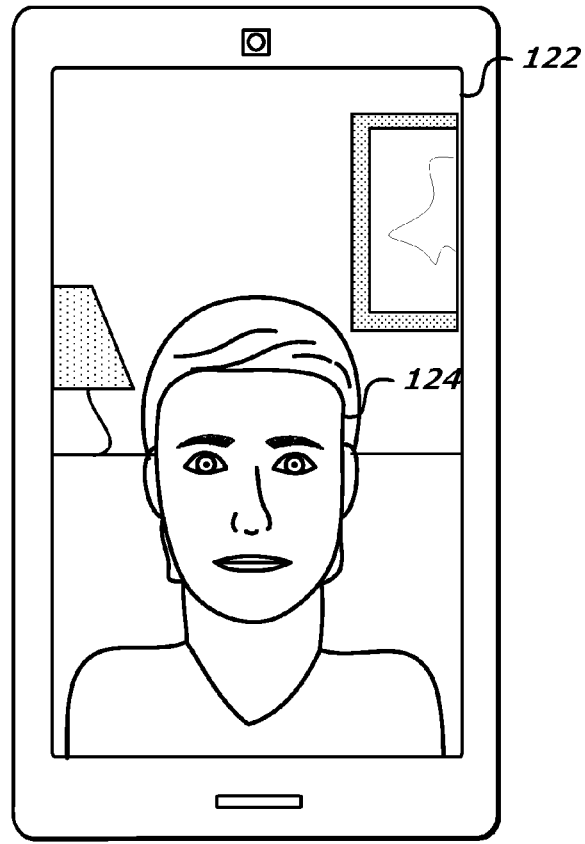
FIG. 1B

APPROACHES FOR OBJECT TRACKING

BACKGROUND

As the functionality offered by computing devices continues to improve, users are utilizing these devices in different ways for an increasing variety of purposes. For example, certain devices utilize one or more cameras to attempt to detect motions or locations of various objects, such as for head tracking or motion input. Continually analyzing full resolution images can be very resource intensive, and can quickly drain the battery of a mobile device. Using lower resolution cameras and less robust algorithms, however, can lead to an increase in the number of false positives and/or a decrease in the accuracy of the object tracking process.

BRIEF DESCRIPTION OF THE DRAWINGS

Various embodiments in accordance with the present disclosure will be described with reference to the drawings, in which:

FIGS. 1A and 1B illustrate an example of how a device might use an image to perform head tracking in accordance with various embodiments;

DETAILED DESCRIPTION

Figure 2A:
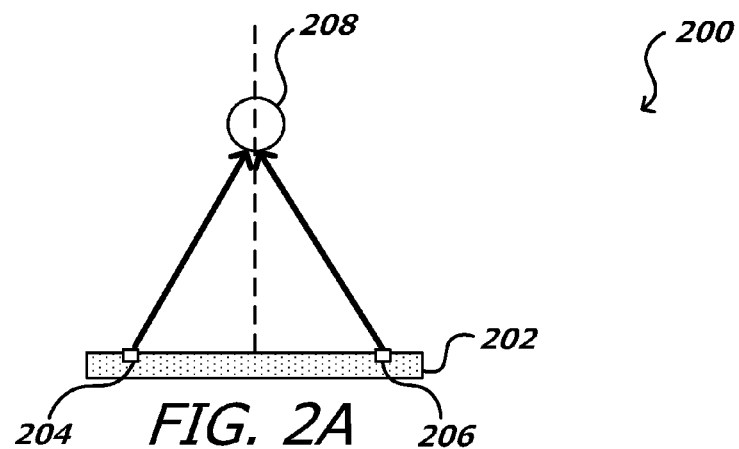
FIGS. 2A, 2B, 2C, and 2D illustrate an example situation where changes in relative head position of a user can be determined using a set of images in accordance with various embodiments.

Systems and methods in accordance with various embodiments of the present disclosure may overcome one or more of the aforementioned and other deficiencies experienced in conventional approaches to determining the position and/or tracking of one or more objects with respect to an electronic device. In particular, various embodiments utilize a two-dimensional model, for example, an ellipse or other similar shape to approximate at least one object of interest represented in an image, such as a head of a user. The ellipse, in various embodiments, can be modeled using a number of shapes, such as polygons, rectangles, or other shapes, and the object can be tracked by locating an ellipse that bounds a maximum intensity gradient of pixel values in each one of a series of gradient images. In various embodiments, each shape is a segment of the image and includes sets of pixels, where each of the pixels in one image segment can share similar characteristics or properties, e.g. color, intensity or texture. Thus, segmentation of the object of interest allows for more easily analyzing the object of interest for object tracking and various other purposes.

In certain embodiments, distance information with image data can be used to determine the presence and/or location of at least one object of interest, such as a head or body of a user. In one embodiment, image data (e.g., still image or video) with depth information is acquired to attempt to locate such an object. The depth or distance information can be obtained in a number of different ways, such as by capturing stereoscopic or three-dimensional image data, or by using a proximity or distance sensor, among other such options. The distance information can be used to designate objects within a determined distance of the device as foreground objects, eliminating other objects from consideration as background objects. The determined distance can be set such that the distance includes the typical distance a user would be from a computing device with which that user is interacting. If more than one such object exists, the largest object can be selected as the user, although other approaches can be used as well, such as to use shape or object recognition processes. In some embodiments, an object location algorithm might look for objects in the image data that meet a certain object detection criterion, such as objects (e.g., areas of a relatively common intensity in an image) of a certain size, shape, and/or location. In some embodiments, the image data represents infrared (IR) light emitted by the device, reflected by the object, and detected by the device.

Once a foreground object such has a head of a user has been identified, a contour of that object can be determined, where the contour can be defined as an outline of the object. This can include, for example, determining an edge region or portion of the foreground object and then selecting a set of pixels that are representative of the edge. The contour can be modeled as an ellipse or other similar shape to approximate the foreground object represented in the image, where the ellipse can be modeled using a number of shapes, such as polygons, rectangles, squares, among others. In this way, an elliptical group of polygons can be used to approximate the contour. Various image processing routines can be used to attempt to determine a location of an ellipse that bounds an average pixel value of pixels that is a maximum in each of a series of images and location information associated with the ellipse can be used to determine and/or track the relative position of the object, as may include a user's or viewer's head with respect to the computing device.

Various other functions and advantages are described and suggested below as may be provided in accordance with the various embodiments.

FIG. 1A illustrates an example situation 100 wherein a user 102 is viewing and/or interacting with a computing device 104. The computing device 104 in this example includes at least one image capture element 106 that is operable to capture image information over a range of angles 108, or field of view, with respect to the device. Although a portable computing device (e.g., a cell phone, an electronic book reader, or tablet computer) is shown, it should be understood that any electronic device capable of receiving and processing input, or at least capable of rendering and/or displaying visual content, can be used in accordance with various embodiments discussed herein. Example devices can also include, for example, desktop computers, notebook computers, personal data assistants, smart phones, video gaming consoles, television set top boxes, wearable computers (e.g., smart glasses, smart watches, etc.), and portable media players.

The camera 106 in this example is positioned on the device such that the person 102 likely will be at least partially included in the field of view 108 when the person is interacting with the device, such as by looking and/or interacting with a display screen of the device. It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture images useful for performing facial recognition, and might have a lower resolution video camera that can be useful for performing object tracking. In other embodiments, a single camera might be used to capture image information for both types of analysis, while still other embodiments might utilize stereo cameras or other elements to determine distance information or perform three dimensional modeling, among other such aspects. In various embodiments, each image capture element may be, for example, a charge-coupled device (CCD), a complementary metal-oxide-semiconductor (CMOS) device, a motion detection sensor, or an infrared image sensor, or can utilize another appropriate image capturing technology. Some devices might have digital still cameras that are able to capture single images at specific points in time, or digital video cameras that are able to continuously capture image information, which can be referred to as a set of frames in at least some embodiments. Also, for a process such as image recognition to be relatively accurate, the image being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein.

In this example, the device 104 is analyzing image data captured by the image capture element 106 to attempt to determine whether the head of the user is present in the field of view 108 of the camera 106. If so, the device will attempt to determine the relative position of the user's head to the device, in order to track the users head or perform another such action such as how to render content on a display of the device. For example, as illustrated in the example 120 of FIG. 1B, a portion of the user 124 is represented in an image captured by the device, here displayed on a display screen 122 of a computing device for simplicity of explanation, although such display is not utilized in many embodiments. As illustrated, the head and shoulders of the user are represented in the image. As illustrated, there are also several other objects in the image, including objects such as a painting, a lamp, and a desk. In order to determine the position of the user and/or track the position of the user, it is necessary to first identify the portion of the image that corresponds to the user's head. Conventional approaches use object recognition or other such processes to attempt to recognize the head based on various features, patterns, or other such information. These processes can be very resource intensive, particularly when analyzing large, full color images. The processing required also can limit the frequency at which the head can be tracked, providing for less precision than may otherwise be desired.

For example, the head location is determined in a set of subsequently captured images, with these locations then compared for purposes of head tracking. The speed with which images can be analyzed limits the number of head positions that can be compared. FIG. 2A illustrates a top view 200 of a situation wherein the user's head 208 is relatively centered with respect to the display screen (i.e., along a normal vector to the center of the screen). In this example, the computing device 202 has a pair of cameras 204, 206 that are configured to capture stereoscopic image data such that the disparity information can be used to determine, in three dimensions, the relative location of the head to the device. Methods for determining distance using disparity data are well known in the art and, as such, will not be discussed in detail herein. The pair of cameras can be part of a single camera assembly that can be used to capture stereoscopic images, or other types of three-dimensional data, where offsets in position (or disparity) due to the offset of the cameras can be used to calculate distance, and can be used to render an image that appears to a user to show objects at their respective distances. In some embodiments, a camera assembly might include a single camera or sensor for capturing images that are able to be used to infer three-dimensional position information. For example, a camera assembly might include an infrared (IR) emitter and capture reflected IR such that distance can be inferred by the relative intensity of the reflected IR. In other embodiments, a camera assembly might include a single camera with a proximity sensor or distance sensor, for example, such that the camera assembly can provide both image and distance data, which can be used to calculate three-dimensional position information. A proximity or distance sensor can include, for example, an ultrasonic sensor, an electromagnetic sensor, a capacitive sensor, a magnetic sensor, and the like, which is able to determine a distance to one or more objects with respect to the sensor. Various other types of camera assemblies can be used as well within the scope of the various embodiments.

Figure 2B:
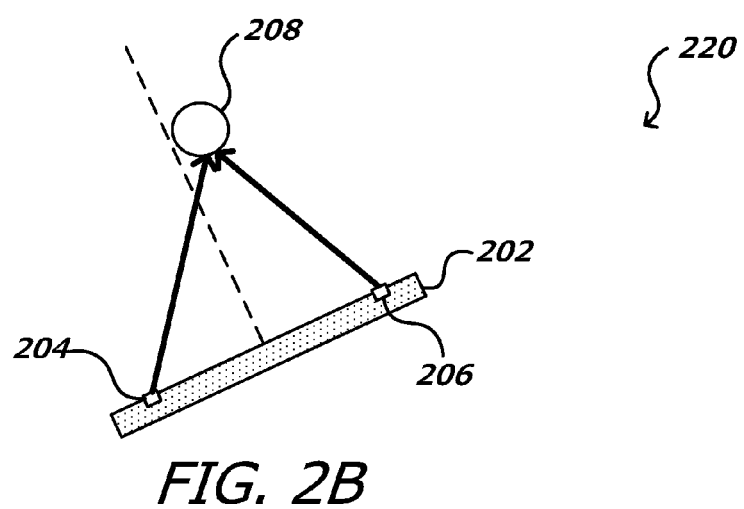
Figure 2C:
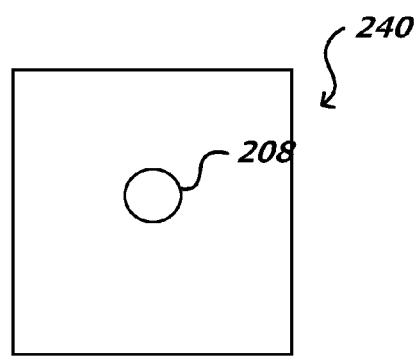
Figure 2D:
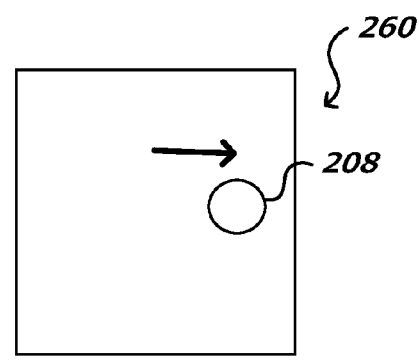

If the device 202 is rotated and/or the head 208 moves as illustrated in the example situation 220 of FIG. 2B, the head may no longer be in the same location along the normal, but may be offset in the captured image data. For example, the image 240 in FIG. 2C illustrates the head 208 in the center of the image, while the image 260 in FIG. 2D illustrates that the position of the head 208 has shifted in the image due to the change in relative position. It should be understood that the images 240, 260 can be three-dimensional images generated using the images captured by each of the stereo cameras 204, 206.

In order for such a process to work in varying lighting conditions, the device might use a light source to illuminate the head or other such object. Since flashing or directing light from a white light source at a user may be distracting, and potentially power intensive, various devices might instead utilize IR light, or radiation of another such wavelength, band, or range. In this way, the IR light can be emitted as needed without being detectable by the user, and the reflected IR light can be detected by at least one camera sensor of the device. It should be understood that stereoscopic imaging is not required, and that other ways of determining depth information for an object represented in an image can be used as well within the scope of the various embodiments. These can include, for example, a single image with structured light data captured using a structured light assembly, varying intensity data due to different amounts of reflected light, proximity sensor data, and the like. In accordance with an embodiment, a structured light assembly can determine distance and shape data by projecting a pattern of light and examining the light reflected back by one or more objects to determine variations in the reflected pattern that are indicative of shape and distance. Differences in intensity data can be used to infer distance, as the amount of light reflected by an object drops off as the distance to that object increases.

Figure 3:
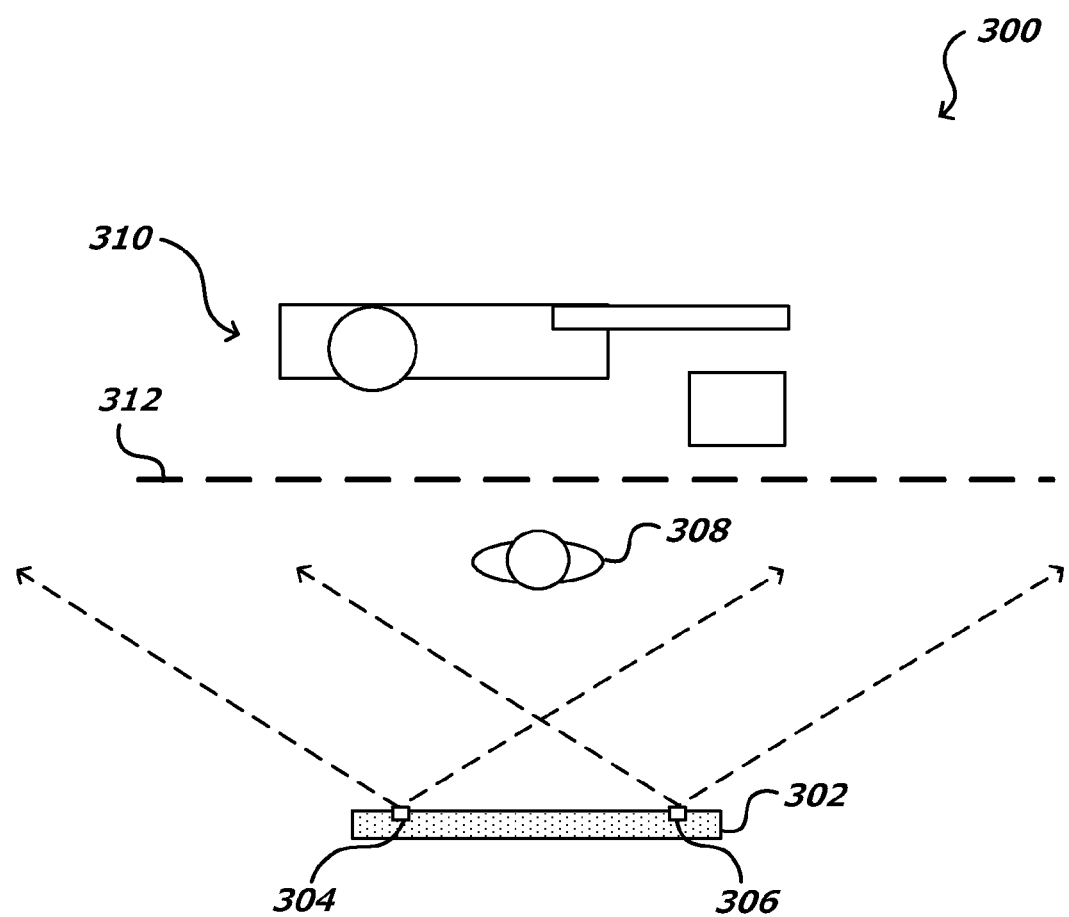
FIG. 3 illustrates an example distance thresholding approach that can be used to segment foreground and background portions of an image in accordance with various embodiments.

When analyzing each of the images to attempt to determine the head position, it can be beneficial to quickly eliminate background regions from consideration, in order to reduce the amount of processing needed to locate the head. As discussed, however, this typically involves analyzing the entire image to attempt to recognize various objects, or types of objects, in the image. It would be beneficial to utilize an approach that automatically removes at least some of the background objects, such that these objects do not need to be included in an object recognition or head location process. For example, in the situation 300 illustrated in FIG. 3, a user 308 is positioned at a typical distance from a computing device 302, with a set of objects 310 behind the user at a greater distance from the computing device. It should be understood that at least some of the relative dimensions in the image are exaggerated for purposes of explanation. In this example, the user 308 and background objects 310 are both within the fields of view of a pair of stereoscopic cameras 304, 306, or other such camera(s), such that distance (disparity) information can be obtained for each of these objects. When using a computing device, a user will typically be within a determined distance of the device, such as within about three feet of the device. In some embodiments, the user can also be determined to typically be at least a determined distance from the device, such as at least 30 cm, or at least six inches. Various other such distances can be used as well, as may depend upon factors such as the type of device or user preferences. Knowing this information enables at least one distance threshold 312 to be determined or selected, which allows objects (or portions of the image) to be segmented as foreground or background. In FIG. 3, the user 308 is closer to the computing device 302 than the threshold 312, such that the user is designated as a foreground object. The other objects 310 are further from the device than the threshold, which causes these objects to be designated as background objects. The corresponding portions of the image can then be handled accordingly, such as by only processing objects designated as foreground objects. In at least some embodiments, a stereo disparity map can be analyzed to determine pixel locations that are beyond the threshold, in order to exclude those portions of the image from consideration. Other segmentation approaches can be used to identify the user in an image, in accordance with various embodiments, where those processes can work on a single image, set of images, or other such data set.

Figure 4A:
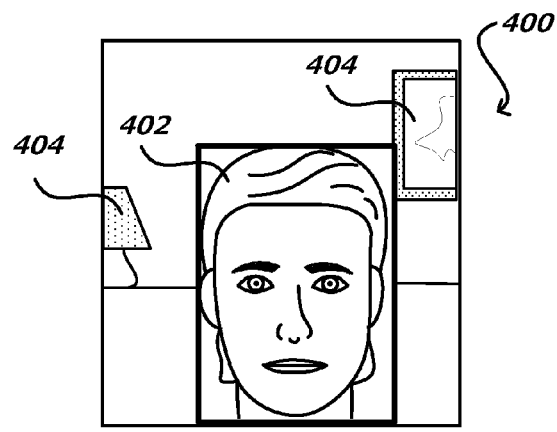
FIGS. 4A, 4B, 4C, and 4D illustrate an example approach to determining a portion of an image corresponding to a user's head to use for head tracking that can be utilized in accordance with various embodiments.
Figure 4B:
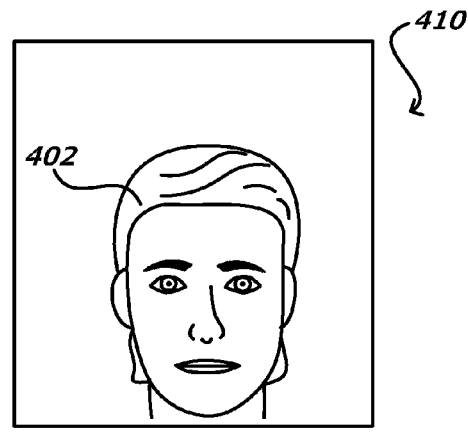
Figure 4C:
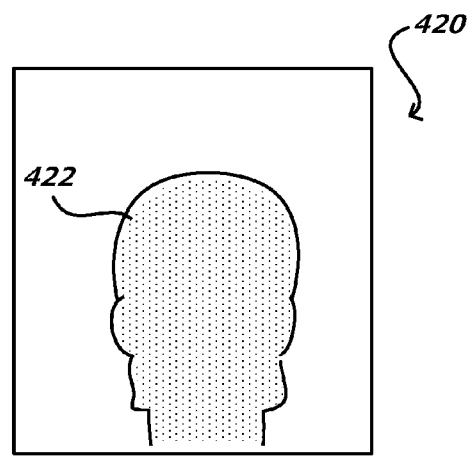

FIGS. 4A through 4D illustrate an example approach for using such information, which can help to locate the head of a user or viewer in at least some embodiments. FIG. 4A illustrates an example image 400 that can be captured by a camera of a computing device in accordance with various embodiments. As discussed, this can include a three-dimensional or stereoscopic image, or image data, captured by at least one pair of cameras or a stereo camera assembly on the computing device. As illustrated, there is a representation of a user 402 and representations of several other objects 404 in the image. Since distance information can be obtained for each part of the image, a threshold can be applied to identify a foreground portion, and a background or remaining portion of the image can be removed, such as is illustrated in the image state 410 of FIG. 4B. It should be understood that the image in FIG. 4B, as well as other images shown, do not need to be created and are presented for purposes of explanation, as in many cases the image data will be analyzed and processed without generating proper images for display. In this image state 410, data for the foreground portion corresponding to the representation of the user 402 is retained, with image data (e.g., pixel, color, or intensity data) for the other portions being removed from consideration. In this way, object recognition or feature detection algorithms can have a significantly reduced amount of data to process. It should be pointed out that reference numbers may be carried over for similar elements between figures, but such usage should not be interpreted as a limitation on the scope of the various embodiments unless otherwise stated.

Once the foreground portion is determined, one or more head or face detection algorithms can be used to attempt to locate a portion of the image that corresponds to the approximate head portion of the user. It should be noted that in various embodiments, head or face detection and tracking may be implemented without such foreground and background determination processes. For example, the head or face detection algorithms can be used to determine an initial location of a user's head without segmenting the image into a foreground and background object. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head position in an image can reduce the amount of resources otherwise needed to perform facial recognition, as the analysis can be performed only on the portion of the image corresponding to the head position. Further, in some embodiments facial recognition might not be performed unless a head or face can first be detected in the captured image.

In many embodiments, however, the actual feature data of that portion of the image is not needed for head tracking and can be discarded or otherwise used only as needed. For example, once the foreground portion 422 of the image is located, as illustrated in example 420 of FIG. 4C, an outer shape or contour of that portion can be determined and used for calculating head location and movement. In some embodiments, the threshold can be used to extract a binarized image of the user from the dense depth map, based at least in part upon the determined threshold. Using a depth map can make the process invariant to lighting conditions. Such an approach further significantly reduces the amount of data to be processed, and enables head position to be determined much more quickly, which allows for a higher frequency of head position determinations and thus a much more accurate and precise head tracking process. In some embodiments, the contour of the foreground portion can be analyzed without further processing, as any object within the threshold distance can be considered to be a user in some embodiments. In other embodiments, however, at least some analysis of the foreground portion can be performed to attempt to ensure that the proper contour is being analyzed. For example, a "head and shoulders" signature or pattern can be compared against the contour to attempt to determine whether the contour resembles a representation of a user. As an example, there might be a range of relative head, neck, and shoulder positions, shapes, ratios, and/or sizes, and the contour must match and/or fit within these ranges to be analyzed for head tracking. In other embodiments, where there might be more than one object detected as foreground, a process can attempt to separate the foreground into separate objects, using information such as distance, color, continuity, and other such information, and then select the largest object as the object to be analyzed. This can help to ensure that the user's head and shoulders are analyzed, instead of objects such as a user's hand or finger that might also be positioned near the computing device.

In at least some embodiments, standard image processing algorithms or image filters can be applied once the background is subtracted or otherwise removed or ignored, which can help to provide an acceptable region for the foreground portion. In some embodiments, image gradients can be used to extract information from at least the foreground portion. Image gradients can be used to extract information from images and can be created from the original image (generally by convolving with a filter, one of the simplest being the Sobel filter). In a gradient image, each pixel measures the change in intensity of that same point in the original image, in a given direction. To get the full range of direction, gradient images in the x and y directions are computed. For example, a gradient image in the x direction measuring horizontal change in intensity and a gradient image in the y direction measuring vertical change in intensity. In accordance with various embodiments, one of the most common uses is in edge detection. After gradient images have been computed, pixels with large gradient values become possible edge pixels. The pixels with the largest gradient values in the direction of the gradient become edge pixels, and edges may be traced in the direction perpendicular to the gradient direction. One example of an edge detection algorithm that uses gradients is the Canny edge detector.

In accordance with various embodiments, other image processing algorithms or image filters can include a temporal filter that can be applied to reduce temporal noise. Temporal filters are typically used to filter the raw image data, before other filtering or processing, to reduce noise due to, for example, motion artifacts. For each pixel in an image, a temporal filter can determine the spatial location of a current pixel and identify at least one collocated reference pixel from a previous frame. A temporal filter can also (or alternatively) process the image data to reduce noise by averaging image frames in the determined temporal direction. Other filters, such as a three frame median filter or box filter can be used as well, such as to remove discrete noise and/or smooth the shape of the foreground object, among other such options. A three-frame median filter can be used to attempt to provide noise reduction while preserving edges and other such features, as such a filter runs through the pixels of images in a set of three frames and replaces each pixel value with the median of the corresponding pixel values in the three frames. A box filter can be used to average the surrounding pixels to adjust pixel values, in some cases multiplying an image sample and a filter kernel to obtain a filtering result. The selection of an appropriate filtering kernel can enable different filtering to be applied, as may include a sharpen, emboss, edge-detect, smooth, or motion-blur filter to be applied. The quality of the segmentation then can be improved, in at least some embodiments, by applying a morphology opening or other such noise removal process, in order to attempt to remove any small holes or gaps in the contour.

Figure 4D:
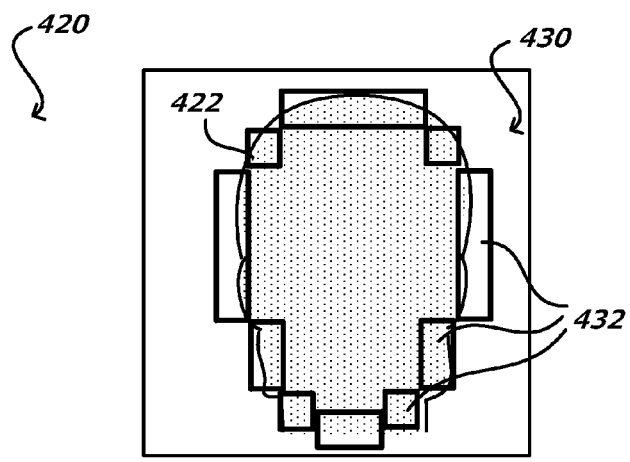
Figure 5A:
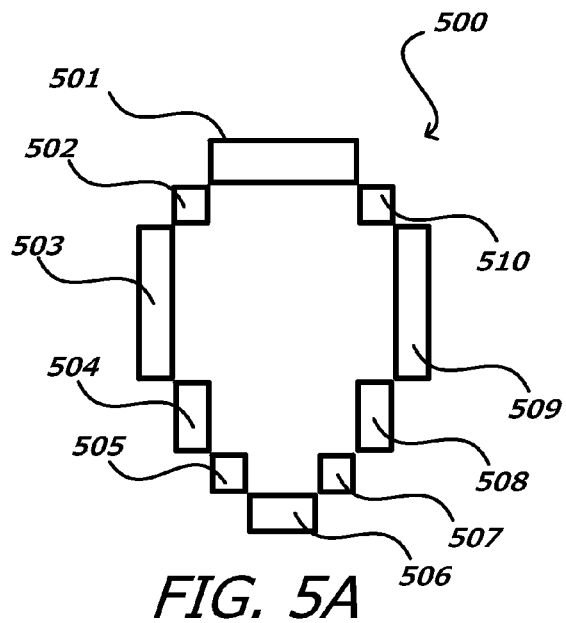
FIGS. 5A, 5B, and 5C illustrate one such approach for tracking the head position once a contour of a head of a user has been determined in accordance with various embodiment.
Figure 5B:
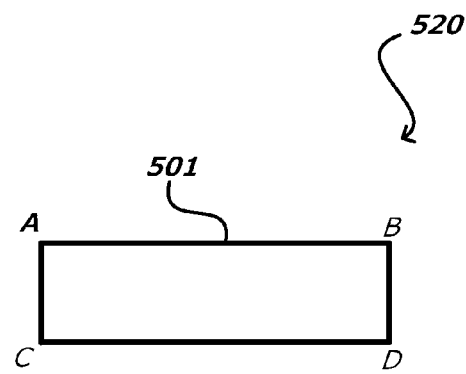
Figure 5C:
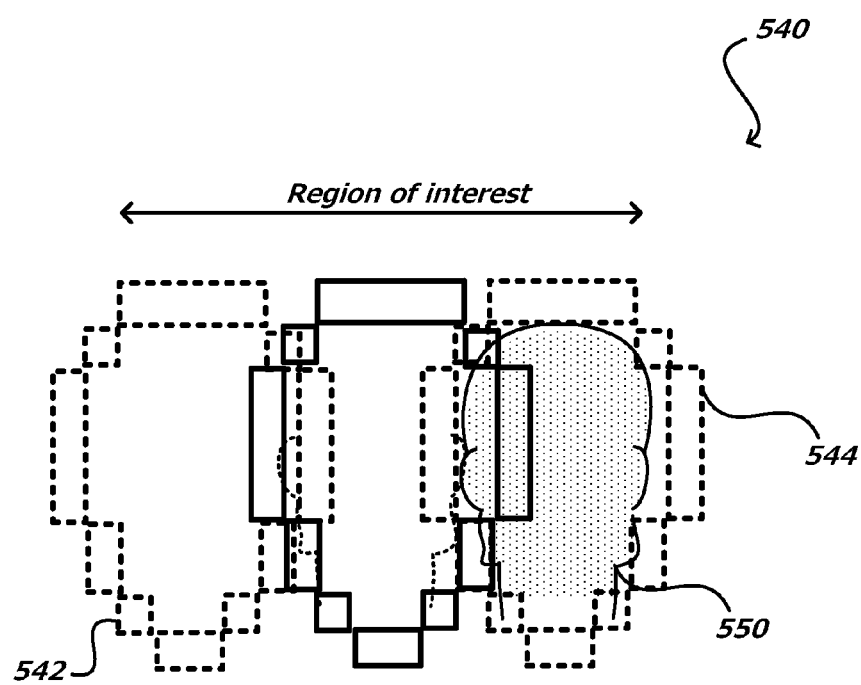

In various embodiments, a process can be used to attempt to approximate the contour using a number of shapes, such as polygons, rectangles, squares, or other such shape such as is illustrated in the image state 430 of FIG. 4D. In this image state 430, the contour is approximated with a number of rectangles 432. It should be noted that the size, shape, and number of rectangles is not limited to the particular arrangement. For example, more or fewer rectangles can be used to approximate the contour. As described, various image processing routines can be used to attempt to determine a location of an ellipse that bounds an average pixel value of pixels that is a maximum in each of a series of images and location information associated with the ellipse can be used to determine and/or track the relative position of the object, as may include a user's or viewer's head with respect to the computing device. For example, FIGS. 5A through 5C illustrate one such approach for tracking the head position once a head portion of the contour has been determined. As illustrated in FIGS. 5A through 5C, elliptic head tracking can be combined with integral images to efficiently track a user's head. Integral images provide for quickly and efficiently generating the sum of pixel values in a rectangular subset. In this way, integral images can be used to determine an average sum of pixel values bounded by a number of rectangles that make up an elliptic contour. The user's head can be tracked by determining a location of an ellipse that bounds a maximum average intensity gradient of pixel values in each of a series of images.

For example, as described, the elliptical contour can be modeled using a number of rectangles, such as rectangles 501 through 510 illustrated in example 500 of FIG. 5A. Using integral image algorithms and approaches, the sum of gradient intensity values for pixels bounded by each rectangle of the elliptical group of rectangles can be determined. For example, situation 520 of FIG. 5B illustrates rectangle 501 defined by points A, B, C, and D, where each point can associated with an x-y position in image space. For discussion purposes, image space can include x-y coordinates of pixel values of the acquired image. The gradient intensity value at any point x, y (e.g., A, B, C, D) in the integral image is just the sum of all gradient intensity value above and to the left of (x, y), inclusive:

$$I(x, y) = \sum_{\substack{x' \leq x \\ y' \leq y}} i(x', y')$$

The integral image can be computed efficiently in at least one pass over the image, using the fact that the value in the integral image table at (x, y) is:

$$I(x,y)=i(x,y)+I(x-1,y)+I(x,y-1)-I(x-1,y-1)$$

Once the integral image table has been computed, the task of evaluating any rectangle can be accomplished in constant time with just four array references. Specifically, using the notation in FIG. 5B, having A=(x0, y1), B=(x1, y1), C=(x1, y0) and D=(x0, y0), the sum of i(x,y) over the rectangle spanned by A, B, C, and D is just:

$$\sum_{\substack{x0 \leq x \leq x1 \\ y0 \leq y \leq y1}} i(x, y) = I(C) + I(A) - I(B) - I(D)$$

In accordance with various embodiments, the process can be repeated for each rectangle (e.g., rectangles 502-510) and the sum of gradient intensity values included in each rectangle can be combined. The average pixel value of the pixels confined within the elliptical group can be determined by dividing the sum of pixel values by the total number of pixels within the elliptical group of rectangles.

To track the relative position of the user's head with respect to the computing device, a location of an ellipse that bounds a maximum average intensity gradient of pixel values in each of a series of images can be determined, wherein the location of the ellipse that bounds the maximum average intensity gradient of pixel values for a particular image corresponds to the location of the user's head. For example, as shown in example 540 of FIG. 5C, for at least a subset of subsequent image frames, a region of head tracking interest can be determined using the last known location of the user's head. The region of head tracking interest or search space can be the set of all states within the region of head tracking interest. Several factors can be taken into consideration when determining the size of the region of head tracking interest, as may include the distance the user (or object) is from the camera, the rate at which the user is moving, the frame rate of the camera, among others.

An integral image is computed at least over the region of head tracking interest. In accordance with various embodiments, the elliptical contour can be moved to a number of different areas within the region of head tracking interest to determine a location of an ellipse that bounds a maximum average intensity gradient of pixel values. This can include, for example, shifting the ellipse to the left 542, right 544, above, and/or below the original location of the representation of the user's head within the region of head tracking interest. At each location, an averaged sum of intensity gradient of pixel values is determined and the area with the maximum value is the location of the user's head. As shown in FIG. 5C, the representation of the user's head 550 has moved to the right. Accordingly, shifting the ellipse to the right will result in determining an ellipse that bounds an average pixel value of pixels confined within the elliptical group of rectangles that is a maximum.

In accordance with various embodiments, because the tracked object may move closer or further from the camera during the object tracking process, various approaches can include performing the search over multiple scales or sizes of ellipses. This can include, for example, adjusting the size (e.g., bigger or smaller) of the ellipse relative to the original ellipse before shifting the ellipse to a new location. Adjusting the size of the ellipse can include increasing/decreasing a size of the rectangles, adding/removing rectangles, or a combination thereof. The amount in which the size of the ellipse is adjusted can be based on several factors, as may include the distance the user (or object) is from the camera, the rate at which the user is moving, the frame rate of the camera, among others. In various embodiments, the size of the ellipse may be adjusted a predetermined amount, such as percentage of the original size or by some other measurement. It should be noted that various other factors can be taken into consideration when adjusting the size of the ellipse, such as a type of camera used (e.g., high resolution, low resolution, monochrome, etc.), light conditions, available power on the device, among others. It should be further noted that adjusting the size of the ellipse can result in adjusting the size and/or number of rectangles used to model the contour of the ellipse. Accordingly, in various approaches, a normalized sum on intensity gradient pixel values can be determined at each location and the area with the highest normalized value can correspond to the location of the user's head.

As mentioned, in some embodiments a higher level of precision may be required. In such cases, various head or face detection algorithms can be used to determine an initial location of the user's head. Further, at predetermined intervals, and/or based at certain events such as not determining an ellipse that bounds a threshold level of gradient intensity values, at least one head or face detection algorithm can be used to determine the location of the user's head. In this way, a feature, shape, or object recognition algorithm, or other such process, can attempt to identify one or more specific locations for tracking purposes.

Other object recognition processes can be used as well within the scope of the various embodiments. These can include, for example, appearance-based processes that search for features such as edges, changes in lighting or color, or changes in shape or size. Various other approaches utilize gradient generation and matching or histogram analysis for object recognition. Other approaches include feature-based approaches, such as may utilize interpretation trees, geometric hashing, or invariance analysis. Algorithms such as scale-invariant feature transform (SIFT) or speeded up robust features (SURF) algorithms can also be used within the scope of the various embodiments. For computer vision applications, a bag of words or similar approach can also be utilized.

Figure 6A:
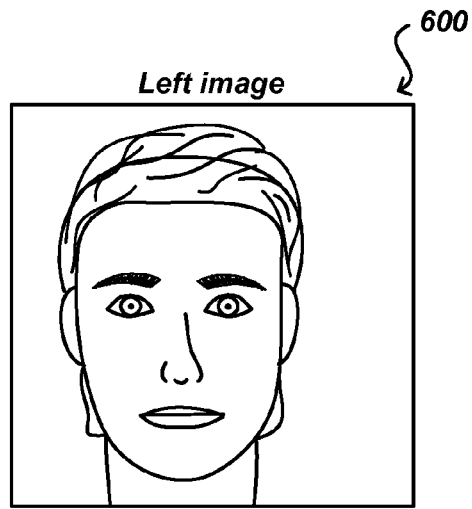
FIGS. 6A, 6B, and 6C illustrate stereoscopic image data that can be captured and utilized in determining a position of a user's head to use for head tracking in accordance with various alternate embodiments.
Figure 6B:
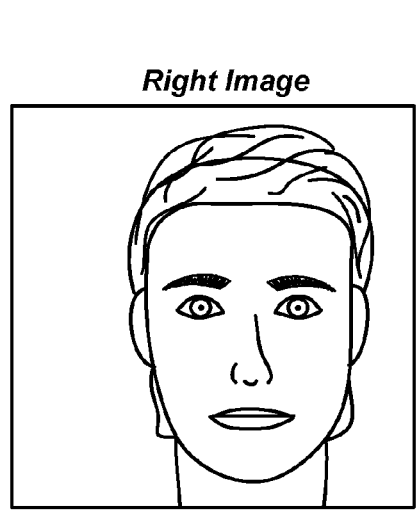
Figure 6C:
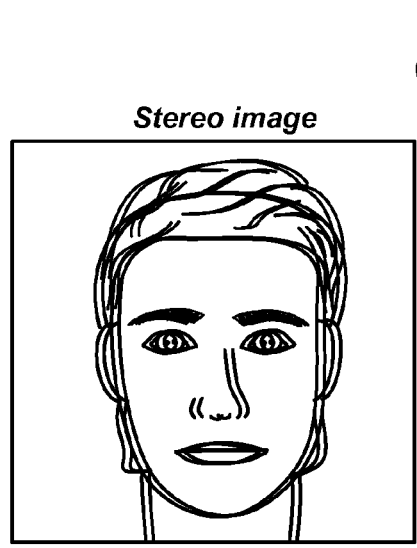

As described, in accordance with various embodiments, image data from multiple cameras, such as a stereoscopic camera pair can be used to determine a location of an ellipse that bounds an average pixel value of pixels confined within the elliptical group of rectangles that is a maximum. As with the previous approach, initial steps such as obtaining the dense stereo disparity map, applying a temporal median filter, applying a box filter for smoothing, and binarizing the image using a threshold to remove background objects can be performed to attempt to isolate one or more foreground objects. In various embodiments, other approaches can be used as well, such as to use shape or object recognition processes. In some embodiments, an object location algorithm might look for objects in the image data that meet a certain object detection criterion, such as objects (e.g., areas of a relatively common intensity in an image) of a certain size, shape, and/or location. A contour of the largest foreground object then can be determined and the contour can be modeled using a number of shapes, such as rectangles. For example, FIGS. 6A and 6B illustrate images 600, 620 that could be captured using a pair of front-facing stereo cameras embedded in a computing device for use in determining stereo disparity. In various embodiments, the pair of front-facing cameras may capture the images simultaneously or substantially simultaneously and therefore would include matching points of interest in their respective images. For example, the user's finger, nose, eyes, eyebrows, lips or other feature points may be identified by the computing device in both images by using any one of the feature detection algorithms mentioned above. FIG. 6C illustrates an example combination image 640 showing the relative position of various objects in the captured images 600, 620. As illustrated, objects closest to the camera, such as the user's hand, have the greatest amount of disparity, or horizontal offset between images. Objects farther away from the device, such as a background object or an object behind the person, have very small amounts of disparity. Objects between these two areas will have intermediate amounts of disparity based upon the relative distance of those objects from the cameras. It should be understood that words such as "horizontal" are used for purposes of simplicity of explanation and should not be interpreted to require a specific orientation unless otherwise stated, as devices can be used in any orientation and cameras or sensors can be placed at various locations on a device as appropriate. As described, the stereoscopic image data can be used to track the location of a representation of the user's head in at least some embodiments. This can include for example, detecting a location of a user's head using at least one head or face detection algorithm, determining a contour that bounds the head, and for subsequent images, tracking the relative position of the user's head with respect to the computing device by determining a location of an ellipse that bounds an average pixel value of pixels for the stereoscopic image pair confined within the elliptical group of rectangles that is a maximum.

Figure 7A:
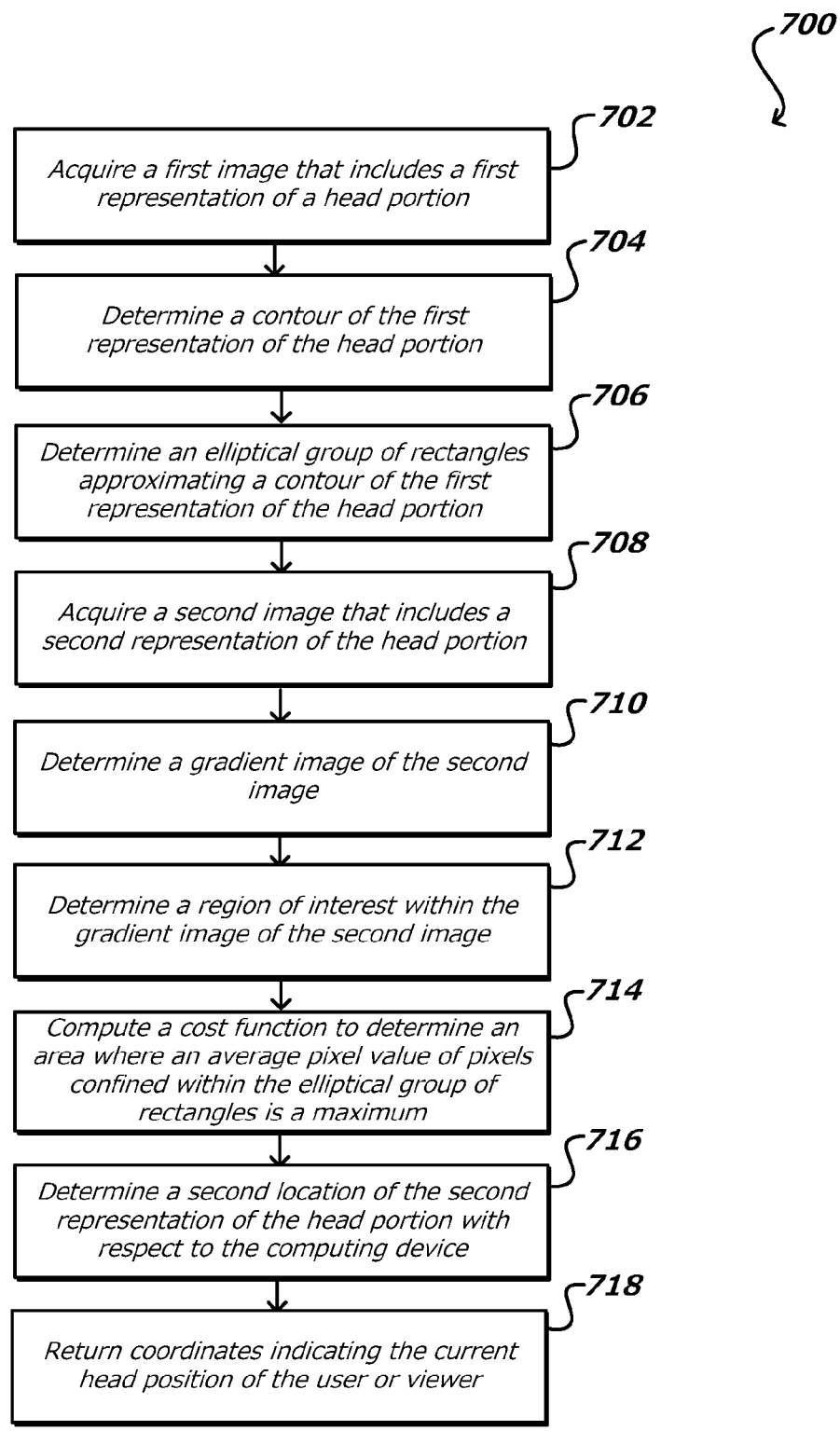
FIGS. 7A and 7B illustrates an example process for determining a portion of an image corresponding to a user's head to use for head tracking that can be utilized in accordance with various embodiments.

FIG. 7A illustrates an example process 700 for locating and/or otherwise tracking a position of a head of a viewer of a computing device that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, head/object detection and/or tracking is activated on a computing device. The tracking can be activated at startup, upon opening an application, in response to a user action, or at any other appropriate time. Approaches for locating and tracking other objects can be used as well as discussed elsewhere herein.

In this example, a first image that includes a first representation of a head portion of a person or other object is acquired 702. It should be noted that although tracking is described in regard to a head of a person, approaches described herein can be applied to various objects. In accordance with certain embodiments, the first image can include distance information as well. As discussed, this can include capturing three-dimensional image data including disparity information, or using a proximity sensor, structured light component, or other such component to capture distance information along with two-dimensional image data. Various other approaches can be used as well. In some embodiments, the image(s) can be acquired using one or more conventional cameras on a computing device, while in other embodiments the image(s) can be acquired using one or more relatively low power cameras, as may capture IR light at a relatively low resolution and color depth (e.g., monochrome). In accordance with various embodiments the color depth of an image can generally be determined by the number of bits or other such measure used to indicate the color of a single pixel and/or to indicate the number of bits used for each color component of a pixel. Color depth generally refers to how finely the levels of color can be expressed, or the range of colors that can be expressed.

In various embodiments, the first image can be analyzed to determine a first location of the first representation of the head portion with respect to a display screen of a computing device. Determining the first representation of the head portion can include using at least one head or facial detection algorithm as may include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head portion position in an image can reduce the amount of resources otherwise needed to perform head or object tracking, as the analysis can be performed only on the portion of the image corresponding to the head portion position. Further, in some embodiments head or object tracking might not be performed unless a head or face can first be detected in the captured image.

In some situations, determining the first representation of the head portion can include analyzing the first image to identify a plurality of feature points using at least one feature point detection algorithm, generating, based at least in part upon the plurality of feature points, a plurality of feature vectors representative of the first representation of the head portion of the person, and determining the first location of the first representation of the head portion based at least in part on the coordinate location of the plurality of feature vectors in the first image. In various embodiments, the first image can be analyzed to attempt to segment the first image into at least a foreground portion and a background portion, using at least one determined distance threshold. As discussed, the threshold can be a fixed threshold or variable threshold, as may be determined based on various image conditions or environmental values. For example, if no objects are detected within three feet of the device then the threshold might be set to some multiple of the closest distance of an object to the device. Similarly, if an application such as a video game is running the threshold might be closer to the device than when a movie is playing, where a viewer might typically be further from the device.

In certain embodiments, to ensure that the detected object is a head, the detected head portion can be analyzed using one or more facial recognition algorithms to attempt to identify facial features of the person represented in the image. This can include identifying unique or distinguishing points, facial marks, geometric shapes or distances, or other such features on the face. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. The image should be of sufficient resolution, clarity, and focus, for example, enabling the algorithms to adequately match the image to information stored for the user. In accordance with certain embodiments, a facial recognition algorithms may take an amount of time to analyze an image, such that other processes can be executed during the analysis. It should be noted that various other processes to detect a user or a portion of a user (e.g., head, face, hands) in image data can be used. Such approaches can include, for example, using template matching to determine whether a user is represented in an image. Template matching is based on matching a pre-defined face pattern or parameterized function to locate the user within an image. Templates are typically prepared manually "offline." In template matching, correlation values for the head and facial features are obtained by comparing one or more templates to an input image, and the presence of a face is determined from the correlation values. Another such approach includes using classifiers that are trained from positive examples of persons represented in images and negative examples of images with no persons. Application of the classifiers to an input image can determine whether a user exists in an image.

A contour of the first representation of the head portion is determined 704. This can include, for example, determining a first gradient image of the first image, identifying an outer edge region of at least a portion of the first representation of the head portion, and determining a set of contour pixels representative of the outer edge region. In this situation, the set of contour pixels can correspond to the contour of the first representation of the head portion. In various embodiments, the first gradient image can be determined upon acquiring the first image and before analyzing the first image to determine a first location of the first representation of the head portion.

In various embodiments, to determine the contour of the first representation of the head portion, at least one segmentation algorithm can be applied to segment the first representation of the head portion from other objects represented in the image. It should be noted that segmenting the image can include, for example, identifying one or more regions or areas of the image or removing or otherwise deleting the one or more regions. A bounding box or other bounding shape can be generated or otherwise determined that is capable of bounding the first representation of the head portion. The bounding box can be determined using, for example, a face or head detection algorithm or other such algorithm. It should be noted that such algorithms are common to those skilled in the art and will not be discussed further herein. An ellipse that fits within the confines of the bounding box can be determined. In certain embodiments, the largest ellipse capable of fitting in the bounding box is used, while in various other embodiments, an ellipse greater or smaller than the bounding box can be used. In any situation, the determined ellipse corresponds to the contour of the first representation of the head portion. In various other embodiments, where a foreground and background portion of the image is determined, a contour of the largest object (if more than one) in the foreground can be determined. This can include processing the image, to attempt to smooth edges and remove gaps in the image, and then determining an outer edge of the object in the image. As discussed, in at least some embodiments a determination can be used as to whether the object matches, within an allowable deviation, a head and shoulders pattern or signature.

Once the contour of the first representation of the head portion is determined, an elliptical group of rectangles approximating a contour of the first representation of the head portion is determined 706, where the elliptical group of rectangles can be located about a center point of the first location. The center point can be determined by calculating a centroid of the contour in the image. A second image that includes a second representation of the head portion of the person is acquired 708, and a gradient image of the second image is determined 710. This can include, for example, applying at least one gradient filter or image processing algorithm to the second image. A region of head tracking interest of the gradient image is determined 712. In various embodiments, the region of head tracking interest is centered around the last known location of the representation of the head portion in the previous frame. The region of head tracking interest or search space can be the set of all states within the region of head tracking interest. Several factors can be taken into consideration when determining the size of the region of head tracking interest, as may include the distance the user (or object) is from the camera, the rate at which an object tracked is moving, the frame rate of the camera, lighting conditions, a current amount of operating power of the device, among others. In certain embodiments, the region of head tracking interest can be a predetermined size and shape, such as a square, a rectangular, polygon, or other shape having a predetermined size. In accordance with an embodiment, a high frame rate can correspond to a smaller region of head tracking interest than a low frame rate. In another embodiment, determining that a tracked object is moving fast can correspond to a larger region of head tracking interest than determining that the tracked object is moving slowly (e.g., below a threshold speed).

The gradient image is analyzed within the region of head tracking interest proximate the center point to compute 714 a cost function to determine a position within the region of head tracking interest where an average sum of pixel values confined within the elliptical group of rectangles is a maximum. In accordance with various embodiments, a cost function can be used to maximize or minimize a real function by systematically choosing input values from within an allowed set and computing the value of the function. For example, the gradient image can be analyzed to determine an average sum of pixel values that is a maximum, where the input is the value of the pixels values within the group of rectangles. In accordance with various embodiments, determining an average sum of pixel values that is a maximum can include dividing the sum of pixel values by the total number of pixels within the elliptical group of rectangles.

In accordance with an embodiment, determining the sum of pixel values within confines of the elliptical group of rectangles can include determining a value of pixels values of a gradient image for each rectangle of the group of rectangles and summing the value determined from each rectangle of the group of rectangles for a particular location to determine a total sum of gradient pixel intensity values for the group of rectangles. Determining a position within the region of head tracking interest where the average sum of pixel values confined or otherwise bound within the elliptical group of rectangles is a maximum includes, for example, moving the elliptical contour to a number of different positions within the region of head tracking interest to determine a location of an ellipse where an average pixel value of pixels confined within the elliptical group of rectangles is a maximum. This can include shifting the ellipse to the left, right, above, and/or below the center point within the region of head tracking interest. At each location, a sum of intensity gradient of pixel values can be determined and the position with the highest value can be the location of the user's head. For example, the contour can be moved to a second position and a second sum can be determined. The process can be repeated for a predetermined number of positions and for each position, a sum of pixel values within confines of the elliptical group of rectangles can be determined. Based at least in part on the different sums, averaged pixel values within confines of the elliptical group of rectangles that is a maximum can be determined and a position of elliptical group of rectangles can be determined. For example, the position of the elliptical group of rectangles can be based on one of a location of a center point of the elliptical group of rectangles or a location of one of or a combination of the group of rectangles. Thereafter, a second location of the second representation of the head portion with respect to the computing device can be determined 716, where the second location is indicative of a head position of the person. Coordinates or other information associated with the second location then can be returned 718 as indicating the current head position of a user, person, or viewer of the device, at least with respect to the computing device. As discussed, the position information then can be used for purposes such as head tracking, motion input, and the like.

Figure 7B:
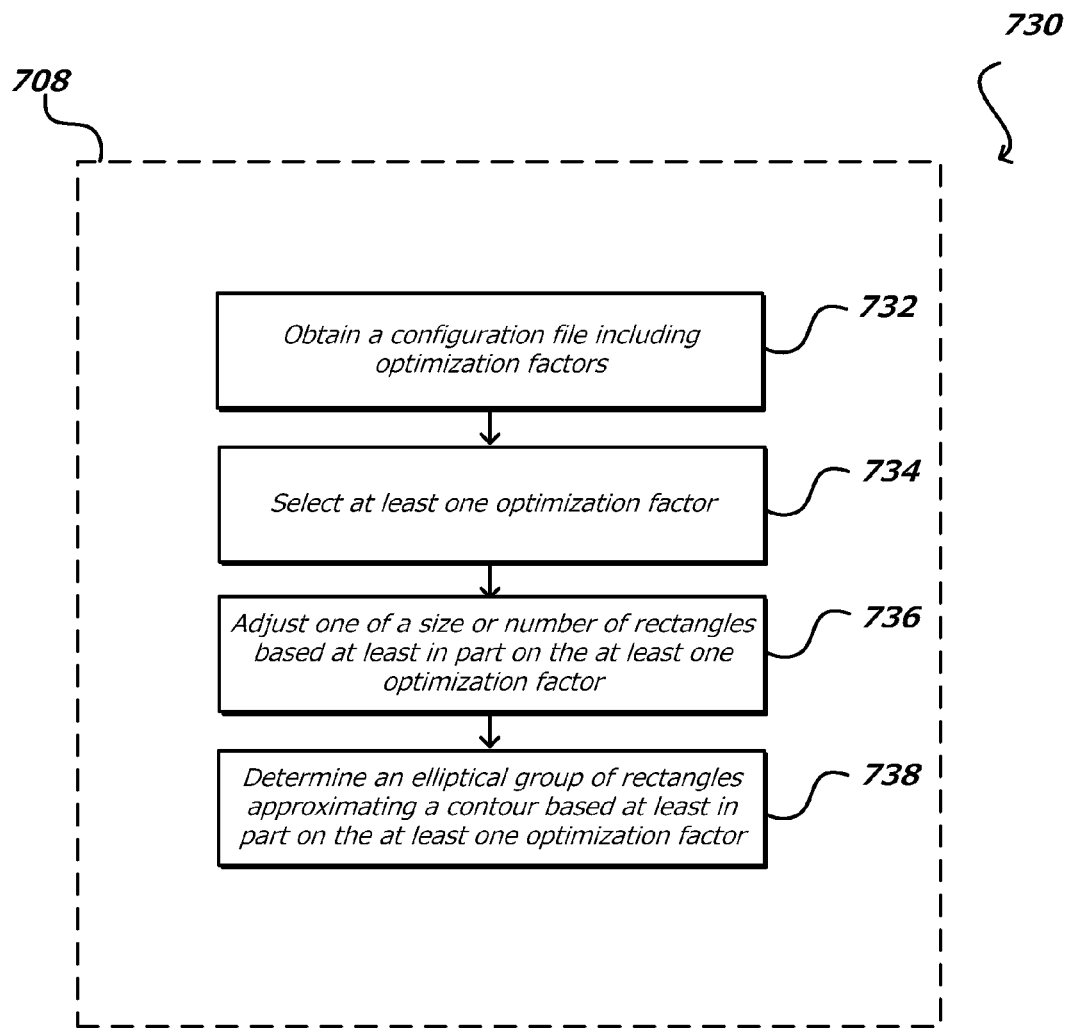

FIG. 7B illustrates an example process 730 for operation 710 of FIG. 7A for determining an elliptical group of rectangles approximating a contour that can be utilized in accordance with various embodiments. As described, the size and number of rectangles used to approximate the contour can vary based on a number of factors, such as a number of optimization factors. The optimization factors can be based on one or more rules or settings that can be used to determine an optimal size and number of rectangles used to approximate the contour. In various embodiments, the size of a rectangle can correspond to the rectangle's width and length, where the rectangle's width and length can be set using one of a number of different units of measurement. The units of measurement can be measured using, for example, pixels, millimeters, centimeters, or any other unit of measurement. Accordingly, in response to determining a contour of the first representation of the head portion, a configuration file including the optimization factors can be obtained 732.

In accordance with various embodiments, the optimization factors used to determine the size and the number of rectangles can include, for example, the distance the user (or object) is from the camera, the rate at which the user is moving, the frame rate of the camera, a type of camera used (e.g., high resolution, low resolution, monochrome, etc.), light conditions, available power on the device, computational processing power of the device, a current mode of operation of the device (e.g., lower power mode, high power mode, etc.), a level of accuracy in tracking the user and/or object, a predetermined level of acceptable computational processing power, among others.

For example, in response to determining that the user (or object) is near the device (e.g., within a first threshold distance), the size of the rectangles can be larger than those when the user (or object) is farther from the device (e.g., outside the first threshold distance). Further, the number of rectangles used to approximate the contour can be less than the number of rectangles used to approximate the contour when the user (or object) is determined to be farther from the device (e.g., outside the first threshold distance). In another example, in response to determining that the user (or object) is moving slowly (e.g., slower than a first threshold speed) relative to the device, the size of the rectangles can be smaller than when the user (or object) is determined to be moving fast (e.g., faster than first threshold speed) relative to the device. In various embodiments, speed of movement can be based on movement of the device, movement of the user (or object), or a combination thereof. In yet another example, in response to determining that the frame rate is above a frame rate threshold, the size of the rectangles can be smaller than when the frame rate is below the frame rate threshold. In yet another example, the size and number of rectangles used to approximate the contour can be based at least in part on whether a front-facing or rear-facing camera is used to track the user (or object). For example, in the situation where a front-facing camera is being used to track the user (or object), fewer rectangles may be used, while in the situation where the rear-facing camera is being used to track the user (or object), more rectangles may be used. In yet another example, in response to determining that the available power is below a predetermined power level, the number of rectangles can be less than when it is determined that the available power is above the predetermined power level. Further, in response to attempting to minimize an amount of processing power used to determine the elliptical group of rectangles that bounds an average pixel value of pixels that is a maximum, the number of rectangles used to approximate the contour can be less than a predetermined number of rectangles. In accordance with certain embodiments, it may be beneficial to increase tracking accuracy. In such a situation, the number of rectangles used may be more than when less accuracy is needed. Further, the size of the rectangles may be selected to be smaller than when less accuracy is needed. It should be noted that the situations described are examples, and the size of the rectangles and/or number of rectangles selected in the situations can be different. Further, the size of the rectangles and/or number of rectangles selected can be based on a combination of any of the situations.

Once the configuration file is obtained, at least one optimization factor is selected 734 to allow for optimally tracking the user (or object), where optimally tracking the user (or object) can include reducing the number of computations required (e.g., reducing a cost function) to track the user (or object) within a threshold amount of accuracy. As described, the size and number of rectangles can be selected to approximate the sum of gradient pixel values around the contour to allow for a reduced amount of calculations. For example, as described, elliptic head tracking can be combined with integral images to efficiently track a user's head where integral images can be used to determine a sum of pixel values bounded by an elliptical group of rectangles that make up the contour. The user's head or other object can be tracked by determining a location of the elliptical group of rectangles that bounds an average pixel value of pixels that is a maximum in each of a series of images. In this way, a cost function or other similar function can be computed to determine a position within a region of head tracking interest where an averaged sum of pixel values confined within the elliptical group of rectangles is a maximum. In accordance with an embodiment, reducing the computation time and power to track the user's head or other object in the field of view of at least one camera of the device can include adjusting 736 one of a size or number of rectangles used to approximate the elliptical contour. Accordingly, once at least one of the size or the number of rectangles is adjusted, an elliptical group of rectangles that approximates the contour can be determined 738, where the size and/or number of rectangles can based at least in part on the at least one optimization factor.

Figure 8:
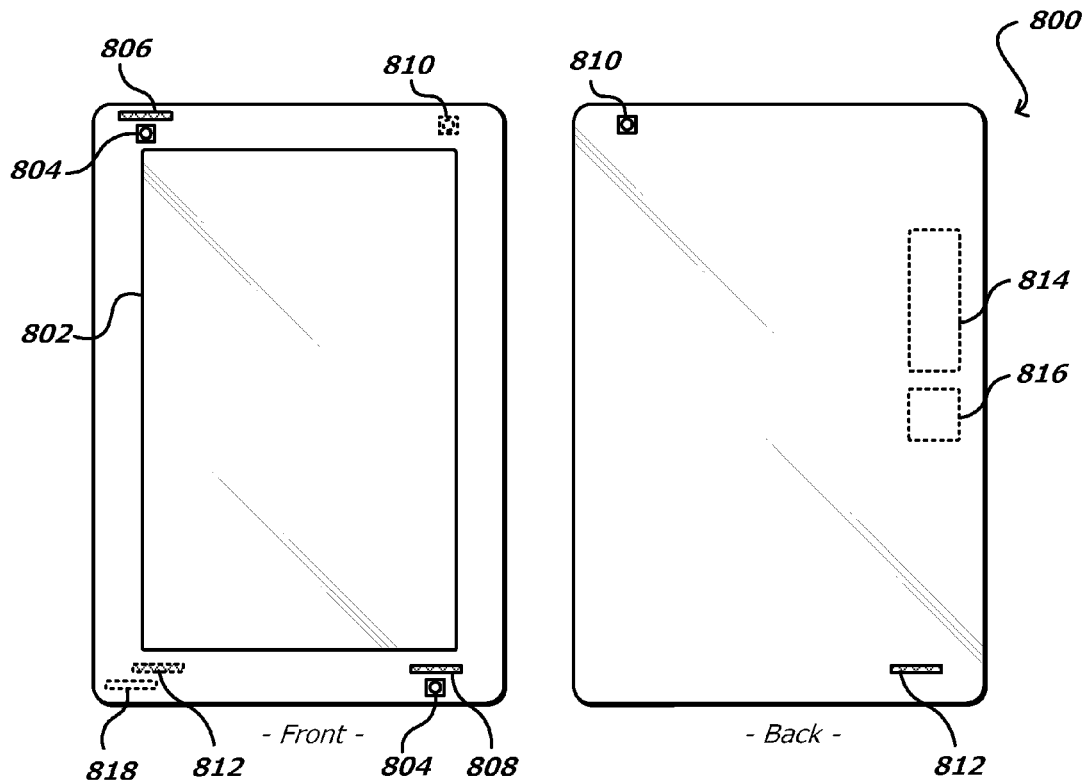
FIG. 8 illustrates an example computing device that can be utilized in accordance with various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled component (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such component. Various other elements and/or combinations are possible as well within the scope of various embodiments.

Figure 9:
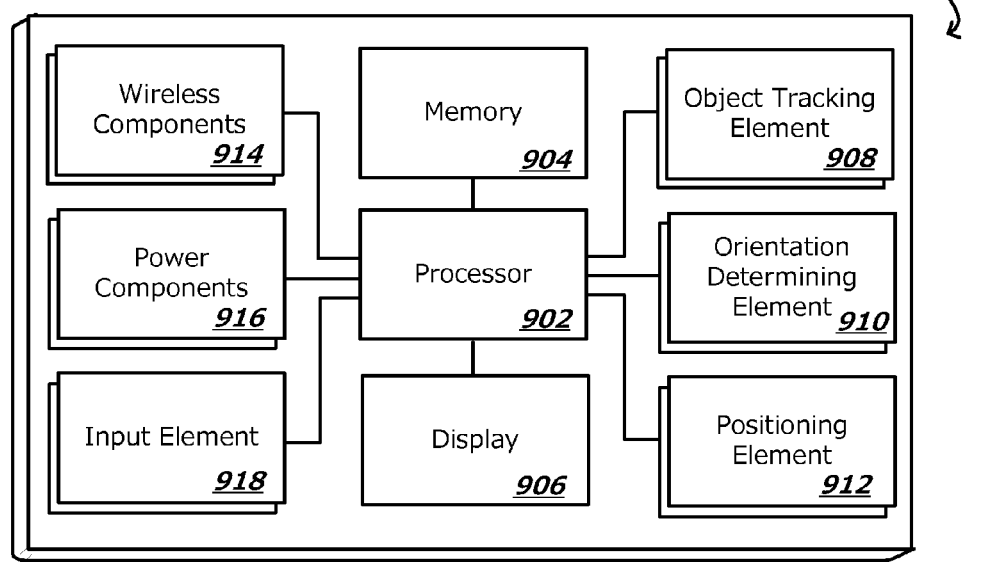
FIG. 9 illustrates an example set of basic components of a portable computing device, such as the device described with respect to FIG. 8.

FIG. 9 illustrates a set of basic components of an electronic computing device 800 such as the device 900 described with respect to FIG. 8. In this example, the device includes at least one processing unit 902 for executing instructions that can be stored in a memory component or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes an object tracking element 908 configured to track at least one object in a field of view of one or more cameras of the computing device. As described, tracking the at least one object can include at least acquiring a first image by the camera, the first image including a first representation of a head of a person; determining a contour of the first representation of the head, the contour having a center point; determining an elliptical group of rectangles approximating the contour of the first representation of the head; acquiring a second image by the camera, the second image including a second representation of the head of the person; determining a gradient image of the second image using at least one image processing algorithm; computing a cost function to determine an area within a region of head tracking interest of the gradient image where an average pixel value of pixels confined within the elliptical group of rectangles is a maximum; and determining a location of the center point based at least in part on the cost function.

In various embodiments, the object tracking element can include, for example, dedicated hardware configured to execute instructions configured to track or locate one or more objects. For example, the object tracking component can include dedicated components, such as an application-specific integrated circuit (ASIC) or other dedicated processor component that is integrated into the device, where the object tracking element can perform at least a portion of the object tracking. In this way, the object tracking element can perform all processes described herein or a portion of said processes and provide information to a system processor or other processor to complete or otherwise continue with the object tracking. In various embodiments, the object tracking element can be part of a device processor or other system processor of the device. In some situations, at least a portion of the functionality of the object tracking element can be performed on dedicated hardware, the device processor, or a combination thereof. As described, the object tracking element can be configured to perform operations including determining a two-dimensional model, for example, an ellipse or other similar shape to approximate at least one object of interest represented in an image, such as a head of a user. The object tracking element can be used to track the object in accordance with the various embodiments described herein, by, for example, locating an ellipse that bounds an average pixel value of pixels that is a maximum in each of a series of images.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 918 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
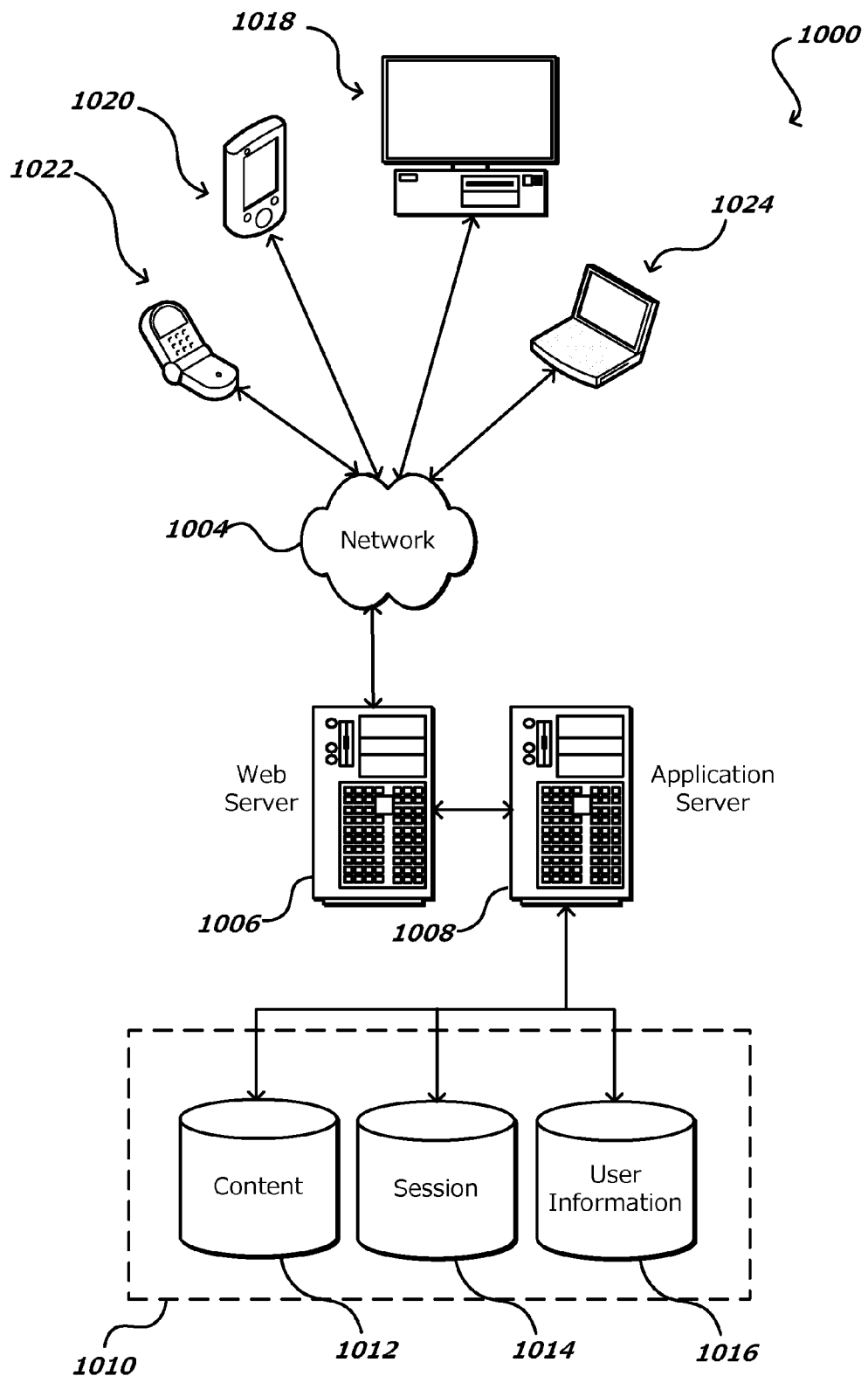
FIG. 10 illustrates an example environment in which aspects of the various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a camera; and
   memory including instructions that, when executed by the at least one processor, cause the computing device to:
     acquire a first image by the camera, the first image including a first representation of a head of a person;
     determine a contour of the first representation;
     determine a center point of the contour using at least one centroid calculation;
     determine a group of rectangles approximating the contour of the first representation, each rectangle of the group abutting at least one adjacent rectangle of the group;
     acquire a second image by the camera, the second image including a second representation of the head;
     determine a gradient image of the second image;
     compute a cost function to determine an area within a region of head tracking interest of the gradient image where an average intensity value of pixels confined within the group is a maximum relative to other positions in the first image; and
     determine a location of the center point based at least in part on the cost function.

2. The computing device of claim 1, wherein the instructions causing the computing device to determine the group further cause the computing device to determine at least one of a size of a first rectangle of the group and a size of a second rectangle of the group, a number of rectangles in the group, or an arrangement of the group, and wherein the first rectangle corresponds to a first set of pixels in a shape of a first respective rectangle and the second rectangle corresponds to a second set of pixels in a shape of a second respective rectangle.

3. The computing device of claim 1, wherein the instructions causing the computing device to determine the group further cause the computing device to:
   locate an outer edge region of at least a portion of the first representation;
   determine a set of contour pixels defining the contour; and
   determine a size and a number of rectangles to approximate the contour based at least in part of the set.

4. A computer-implemented method, comprising:
   determining, in a first image, a first representation of an object;
   determining a contour of the first representation;
   determining geometric shapes approximating the contour, each geometric shape of the geometric shapes abutting at least one adjacent geometric shape of the geometric shapes;
   determining, in a gradient image of a second image, an area where an average intensity value of pixels confined within the geometric shapes is a maximum relative to other positions in the first image; and
   determining a location of a second representation of the object in the area.

5. The computer-implemented method of claim 4, wherein the object is a head portion of a user, and the method further comprising:
   determining a distance of the object with respect to a computing device; and
   determining a foreground portion and a background portion of the first image based at least in part on the distance, the foreground portion including the first representation, the object being detected closer than a threshold distance to the computing device.

6. The computer-implemented method of claim 5, further comprising:
   determining the first representation corresponds to the head portion based on at least one of:
     selecting, in the first image, the first representation based on the first representation being a largest representation of an object of a plurality of representations of objects; or
     identifying the first representation as matching an elliptical shape.

7. The computer-implemented method of claim 5, further comprising:
   determining that the first representation corresponds to the head portion using at least one of a face detection algorithm, a facial recognition algorithm, a feature detection algorithm, or a pattern matching algorithm.

8. The computer-implemented method of claim 4, wherein the geometric shapes include at least one of a rectangle, a polygon, or a square.

9. The computer-implemented method of claim 4, wherein determining the geometric shapes further comprises:
   locating an outer edge region of the first representation; and
   determining a set of contour pixels representative of the first representation, the set of contour pixels defining the contour.

10. The computer-implemented method of claim 4, wherein determining the location includes:
    identifying, in the gradient image, a plurality of feature points;
    generating, based at least in part on the plurality of feature points, a plurality of feature vectors representative of the second representation; and
    determining the location based at least in part on the plurality of feature vectors.

11. The computer-implemented method of claim 4, wherein determining the geometric shapes further includes:
    determining a first rectangle and a second rectangle, the first rectangle having a first predetermined size.

12. The computer-implemented method of claim 11, wherein the predetermined size is based at least in part on one of a distance of the object with respect to a computing device, a speed of the object with respect to the computing device, a frame rate of a camera of the computing device, a power level of the computing device, processing power of the computing device, or a level of accuracy for object tracking.

13. The computer-implemented method of claim 4, wherein the geometric shapes include a first polygon and a second polygon, and wherein determining the area includes:

determining a sum of intensity values for the first polygon and the second polygon using an integral image algorithm;

determining a number of pixels confined by the first polygon and the second polygon; and dividing the sum by the number.

14. The computer-implemented method of claim 4, wherein the geometric shapes include a first rectangle and a second rectangle, and wherein determining the area includes:

determining a first sum of intensity values within the first rectangle using an integral image algorithm;

determining a second sum of intensity values within the second rectangle using the integral image algorithm; and determining a first total of intensity values based at least in part on the first sum and the second sum.

15. The computer-implemented method of claim 14, wherein the first total corresponds to a first location of the first rectangle and the second rectangle, and wherein determining the area includes:

comparing the first total to a second total of intensity values corresponding to a second location of the first rectangle and the second rectangle, the first total being greater than the second total;

determining a set of coordinates associated with the first location; and providing the set of coordinates to an object tracking process as a current object position.

16. The computer-implemented method of claim 4, further comprising:

determining a set of pixels corresponding to the contour, each pixel of the set of pixels having a respective set of coordinates with respect to the first image; and calculating a centroid location with respect to the set of pixels, the centroid location being selected as a center point of the contour, the center point being used to determine the location.

17. The computer-implemented method of claim 4, wherein the geometric shapes include a first geometric shape having a first area and a second geometric shape having a second area, the first area being different from the second area.

18. A computing device, comprising:

at least one processor; and memory including instructions that, when executed by the at least one processor, cause the computing device to:

determine, in a first image, a first representation of an object;

determine a contour of the first representation;

determine geometric shapes approximating the contour, each geometric shape of the geometric shapes abutting at least one adjacent geometric shape of the geometric shapes;

determine, in a gradient image of a second image, an area where an average intensity value of pixels confined within the geometric shapes is a maximum relative to other positions in the first image; and determine a location of a second representation of the object in the area.

19. The computing device of claim 18, wherein the geometric shapes include a first polygon and a second polygon, and wherein the instructions further cause the computing device to:

determine a sum of intensity values for the first polygon and the second polygon using an integral image algorithm;

determine a number of pixels confined by the first polygon and the second polygon; and divide the sum by the number.

20. The computing device of claim 18, wherein the instructions further cause the computing device to:

determine a set of coordinates associated with the location; and provide the set of coordinates to an object tracking process as a current position of the object.

21. The computing device of claim 18, wherein the instructions further cause the computing device to:

perform a centroid calculation to determine a center point of the contour.

* * * * *